(12) United States Patent
Fink, Jr.

(10) Patent No.: US 6,491,282 B2
(45) Date of Patent: Dec. 10, 2002

(54) POPPET RELEASE FOR POPPET VALVE OF A FUEL DISPENSING NOZZLE

(75) Inventor: Arthur C. Fink, Jr., Franklin County, MO (US)

(73) Assignee: Husky Corporation, Pacific, MO (US)

( * ) Notice: Subject to any disclaimer, the term of this patent is extended or adjusted under 35 U.S.C. 154(b) by 0 days.

(21) Appl. No.: 09/739,612

(22) Filed: Dec. 19, 2000

(65) Prior Publication Data

US 2002/0074535 A1 Jun. 20, 2002

(51) Int. Cl.[7] ................................................ F16K 1/00
(52) U.S. Cl. ........................ 251/319; 251/321; 251/333; 251/334
(58) Field of Search .......................... 251/319, 77, 320, 251/321, 333, 334, 231, 78, 84, 85, 87

(56) References Cited

U.S. PATENT DOCUMENTS

| | | | | |
|---|---|---|---|---|
| 3,557,837 A | * | 1/1971 | Giwosky | 137/630.14 |
| 3,759,293 A | * | 9/1973 | Tanaka | 137/598 |
| 3,800,817 A | * | 4/1974 | Gropp et al. | 137/242 |
| 3,877,480 A | * | 4/1975 | Hughes et al. | 137/329.06 |
| 4,248,403 A | * | 2/1981 | Scull | 251/298 |
| 4,343,337 A | * | 8/1982 | Healy | 137/494 |
| 4,397,447 A | * | 8/1983 | Fink, Jr. | 141/206 |
| 4,450,859 A | * | 5/1984 | Bergman | 137/516.29 |
| 4,487,238 A | * | 12/1984 | Carder, Sr. | 141/206 |
| 4,559,982 A | | 12/1985 | Fink, Jr. | |
| 4,596,278 A | | 6/1986 | Fink, Jr. | |
| 5,474,115 A | | 12/1995 | Fink, Jr. | |

* cited by examiner

*Primary Examiner*—Henry C Yuen
*Assistant Examiner*—David A Bonderer
(74) *Attorney, Agent, or Firm*—Paul M. Denk

(57) ABSTRACT

A fuel dispensing nozzle includes an inlet for the fuel being pumped, a spout for dispensing of the fuel, a poppet valve between the inlet and outlet, and a handle which is operable to move the poppet valve between an opened position in which fuel can flow from the inlet to the and a closed position in which fuel is prevented from flowing from the inlet to the spot. The poppet valve includes a valve member having a cap, a seal received on an under side of the cap, and a skirt, which is movable relative to the cap. The seal engages and is disengaged from the valve seat to close and open the valve. The valve member skirt has a sloped surface which engages the seal. The valve skirt is lifted by a valve stem, and when lifted, the valve member skirt engages the seal to progressively lift the seal off the valve seat. Conversely, when the stem is dropped, the valve member skirt causes the seal to progressively engage the valve seat, such that the valve does not substantially instantaneously go from a fully seated (or closed) position to a fully unseated (or opened) position (and vice versa).

3 Claims, 3 Drawing Sheets

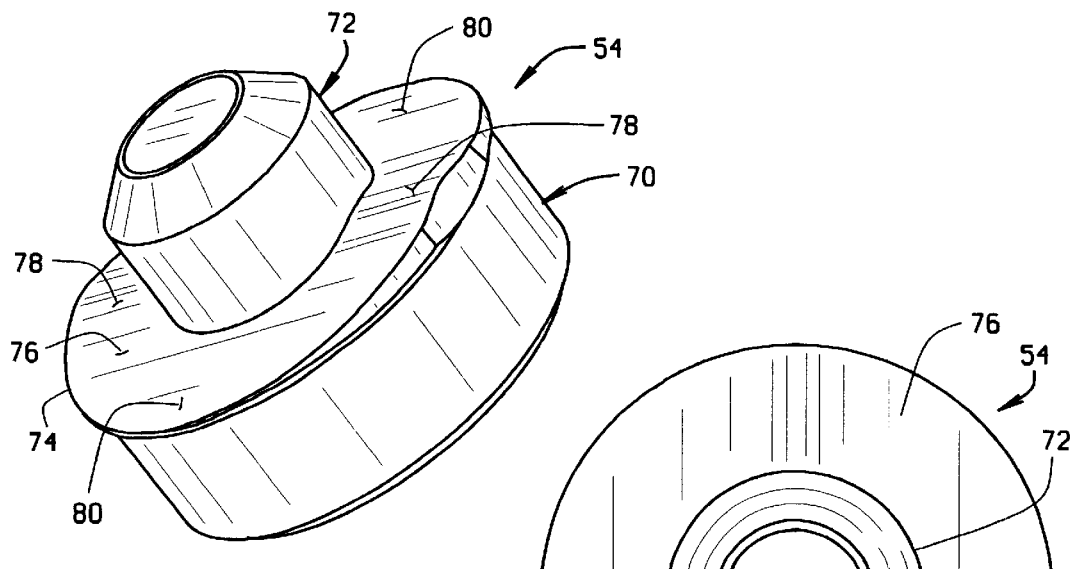
FIG. 5
FIG. 6
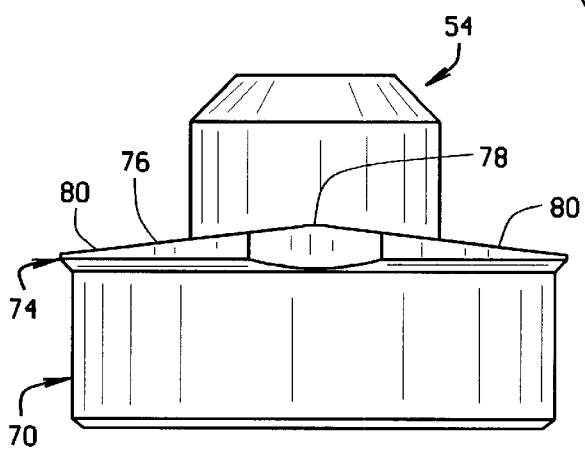
FIG. 7
FIG. 8

POPPET RELEASE FOR POPPET VALVE OF A FUEL DISPENSING NOZZLE

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This invention relates to fuel dispensing nozzles, such as are used at gas stations, and in particular, to a poppet release for such fuel dispensing nozzles.

Fuel dispensing nozzles of the type used in gas stations almost always are provided with an automatic shutoff to prevent overflow of gasoline being dispensed. The automatic shutoff feature is generally responsive to the flow of air through a vent tube in the nozzle. A poppet valve is generally used to push the operating lever of the nozzle from a dispensing position to an off position. It have been found that when the automatic shutoff feature is activated to shut off the flow of fuel through the nozzle, the poppet valve closes with a "bang". It would be desirable to eliminate this "bang" and to provide for a smoother closing of the poppet valve.

BRIEF SUMMARY OF THE INVENTION

A fuel dispensing nozzle includes an inlet for the fuel being pumped, a spout for dispensing of the fuel, a poppet valve between the inlet and outlet, and a handle which is operable to move the poppet valve between an opened position in which fuel can flow from the inlet to the and a closed position in which fuel is prevented from flowing from the inlet to the spot. The poppet valve includes a valve member, a valve seat, a valve stem, and a biasing spring. The valve member is sized to sit on the valve seat to close the valve. The valve stem is operatively connected to the handle toraise the valve member off the valve seat when the handle is actuated. The spring biases the valve member to a closed position.

The valve member includes a cap, a flexible seal, and a skirt movable relative to the cap and seal. The valve cap has a flange which the seal is adjacent. The skirt, which is movable axially relative to the cap and seal, has a sloped upper surface which engages the underside of the flexible seal as the valve is opened. The valve seat is substantially even or flat. Thus, as the valve member skirt is lifted, the sloped surface of the valve member causes the seal to be progressively lifted off the valve seat. Preferably, the sloped surface includes a generally centrally located apical section (i.e., along a diameter of the skirt top surface) and sloping surfaces extending from opposite sides of the apical section.

By using a flexible seal and the sloped surface of the skirt, when the valve is opened, one edge of the valve member leaves the seat first, such that the valve is partially opened. As the valve is continued to be opened, it passes through this partially opened state to be fully opened. When the valve is closed, it passes through a partially closed position, in which one edge of the valve member contacts the seat first. Upon further closing, the valve member is in full contact with the seat.

BRIEF DESCRIPTION OF THE SEVERAL VIEWS OF THE DRAWINGS

FIG. 5 a perspective view of a poppet skirt of the poppet valve member;

FIG. 6 is a top plan view of the poppet skirt;

FIG. 7 is a side elevational view of the poppet skirt; and

FIG. 8 is another side elevational view of the poppet skirt rotated 90° C. from the view of FIG. 7.

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what I presently believe is the best mode of carrying out the invention.

Figure 1:
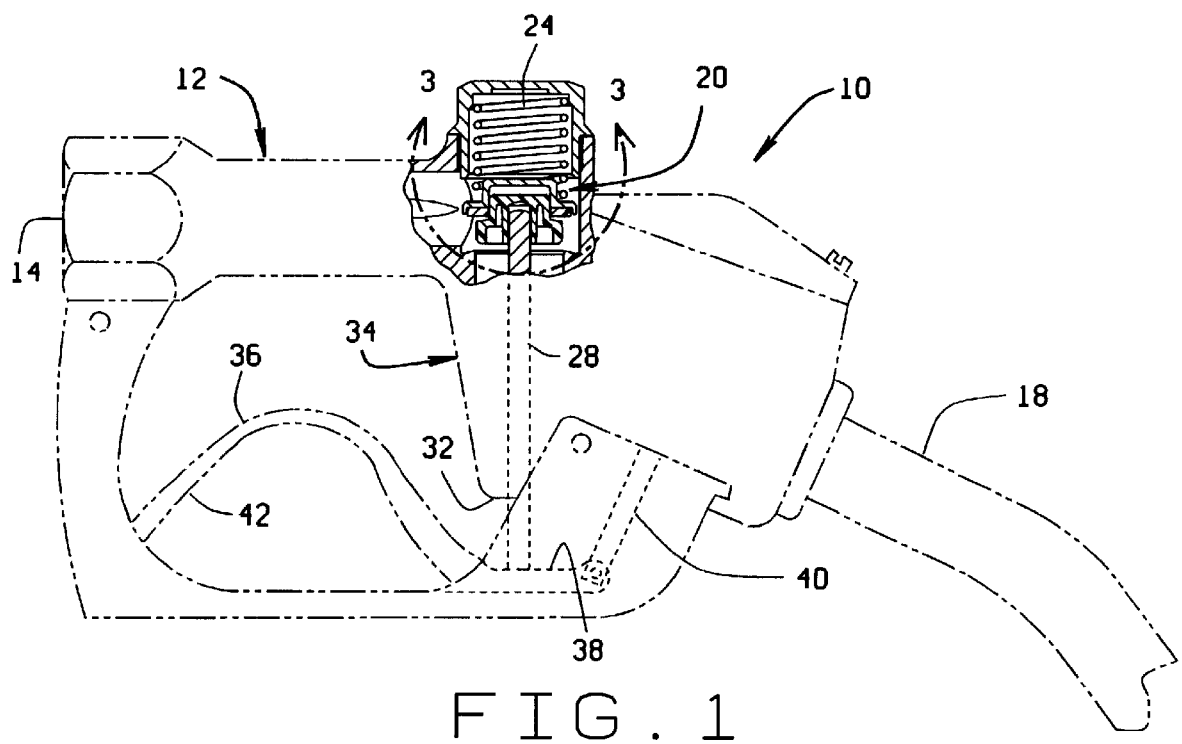
FIG. 1 is a cross-sectional view of a fuel dispensing nozzle incorporating a poppet valve member of the present invention, the poppet valve being shown in an opened position.

Referring to FIG. 1, a nozzle for dispensing liquids such as gasoline, diesel fuel or the like is indicated generally at 10. The nozzle can be a standard dispensing nozzle, or any of the vapor recovery nozzle type, such as a vacuum assist, or a balanced pressure type, as shown in FIG. 1. The nozzle includes a body 12 having an inlet 14 to which a fuel hose (not shown) is connected. The nozzle also has an outlet communicating with a spout assembly 18. The spout assembly 18 has a mouth which is insertable into the fill pipe of an automobile fuel tank (as is known). Disposed within the body 12, between the inlet and outlet, is a poppet valve 20. The poppet valve 20 includes a valve member 22 which is biased by a spring 24 into sealing engagement with a poppet valve seat 26. The poppet valve member 22 is mounted to the upper end of a valve stem 28. The poppet valve 20 is located in the upper portion of the body 12, and the valve stem 28 extends downwardly through the body. The lower end of the stem 28 projects through an opening in the base 32 of a body section 34 of the nozzle 10. An operating lever 36 for the nozzle has one end 38, its pivoting functional end, connected to the lower end of an automatic shut-off plunger 40 by, for example, a pin. The other end 42 of the lever 36 is grasped by the hand of a user, and when squeezed, the upward pressure on the lever forces the valve stem 28 upwardly. This moves the valve member 22 off the valve seat 26, opening the valve 20, and permitting fuel to flow into the spout assembly 18.

Figure 2:
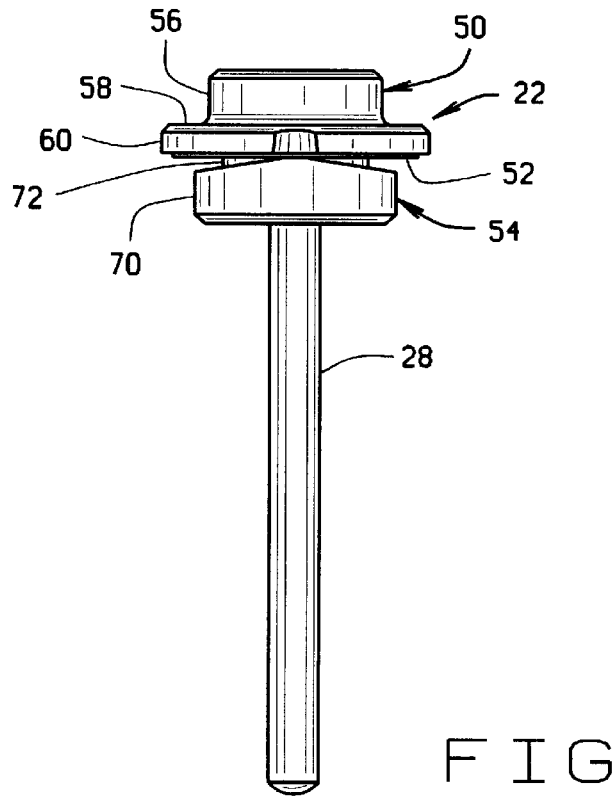
FIG. 2 is an enlarged side elevational view of the valve member and valve stem of the poppet valve.

Poppet valves have long been used in gas nozzles. A prior art poppet valve member is shown in my prior U.S. Pat. No. 4,397,447, which is incorporated herein by reference. The valve member of the 4,397,447 patent has a generally cylindrical base section which sits on the valve stem, a flat circular flange, and a boss on top of the flange. In this valve member, the biasing spring is in full contact with the upper surface of the flange. In fuel dispensing nozzles which utilize such poppet valve members, it has been found that, when the valve is closed, the valve goes quickly from a fully opened position to a fully closed position very quickly (i.e., there is no intermediate position). Stated differently, the valve member is at one moment fully out of contact with the valve seat such that the valve is fully opened, and, in the next moment, the valve member is fully engaged with the valve seat such that the valve is fully closed. This substantially instantaneous switch from a fully unseated (or fully opened) position to a fully seated (or fully closed) position results in a bang or slight kick when the nozzle is shut off. The poppet valve member 22 of the present invention solves this problem. The poppet valve member 22, shown in detail in FIGS. 2–4, includes a hollow cap 50, a flexible seal 52, and a poppet skirt 54.

The poppet cap 50 includes a generally cylindrical central post 56 and an annular flange 58 extending around the base of the cylindrical post 56. A small lip 60 extends down from the outer edge of the flange 58. The cylindrical post 56 and spring 24 are sized so that the spring 24 can fit around the cylindrical post 56 and rest on the upper surface of the flange 58.

The seal 52 is annular in shape. It has an outer diameter sized to fit within the cap lip 60, and rests against the bottom surface of the flange 58. The inner diameter of the seal 52 is substantially equal to the inner diameter of the cap post 56. As noted, the seal 52 is flexible, and is made of a material which will withstand exposure to gasoline, or other fuels to which it may be exposed.

Figure 3:
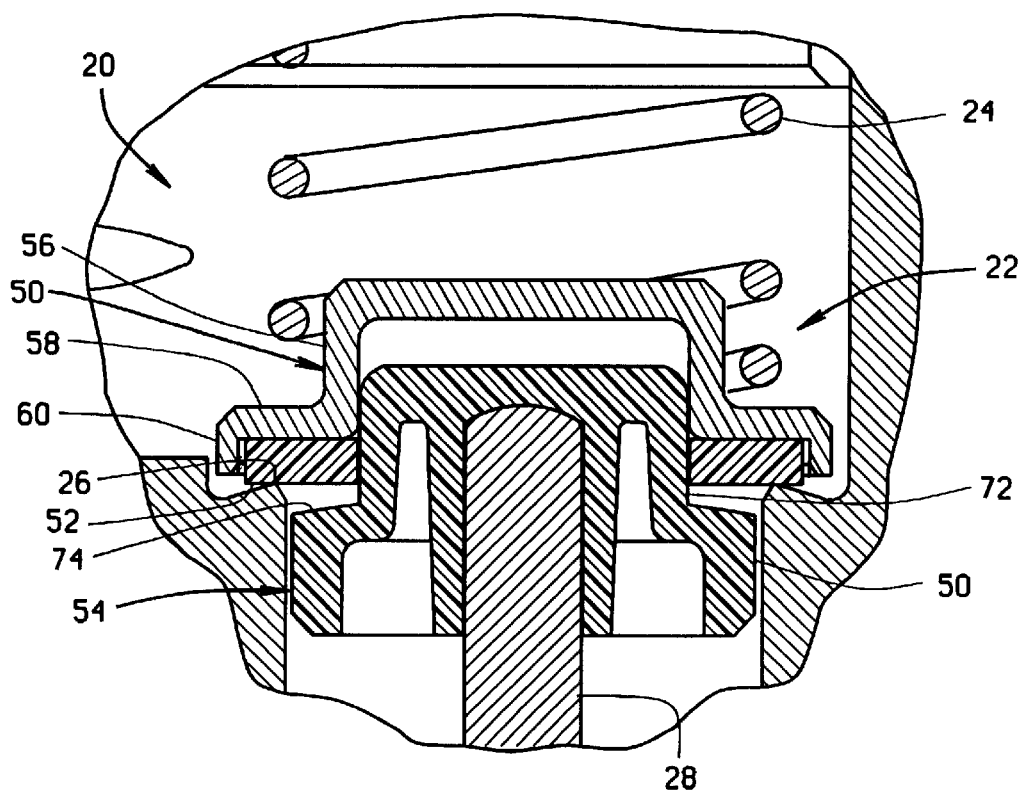
FIG. 3 is an enlarged fragmentary cross-sectional view of the poppet valve taken along circle 3—3 of FIG. 1 wherein the poppet valve is closed.

The poppet skirt 54 includes a base 70 sized to be received in the seat 26, as seen in FIG. 3. A central cylindrical post 72 extends up from the center of the base 70 to define a flange 74 around the post 72. The skirt post 72 is sized to pass through the seal 52 to be received in the cap post 56. The top surface 76 of the skirt flange 74 is beveled, as best seen in FIGS. 5–8. The flange 74 has an flat apical section 78 which extends across a diameter of the flange 74. The flange then slopes downwardly on opposite sides of the apical section 78 to define sloped flanks 80. The poppet skirt 54 is hollow, and includes an hollow tube 82 extending from the bottom side of the skirt post 72. The skirt tube 82 is sized to receive the valve stem 28.

The poppet skirt 54 is received in the poppet cap 50 such that the flange 74 is adjacent the seal 52. When the poppet valve is closed, the poppet member 22 is in the position shown in FIG. 3. In this position, the spring 24 presses down on the poppet cap 50 to seat the seal 52 against the valve seat 26. The bottom surface of the cap flange 58 is flat, and hence, the seal 52 is in a flat position to be in contact with the seat around the full periphery of the seat, to seal the poppet valve, and prevent the flow of fuel through the nozzle 10. Additionally, as can be seen, when the valve is in the closed position, there is a gap between the top of the skirt post 72 and the inner surface of the top of the cap post 56.

Figure 4:
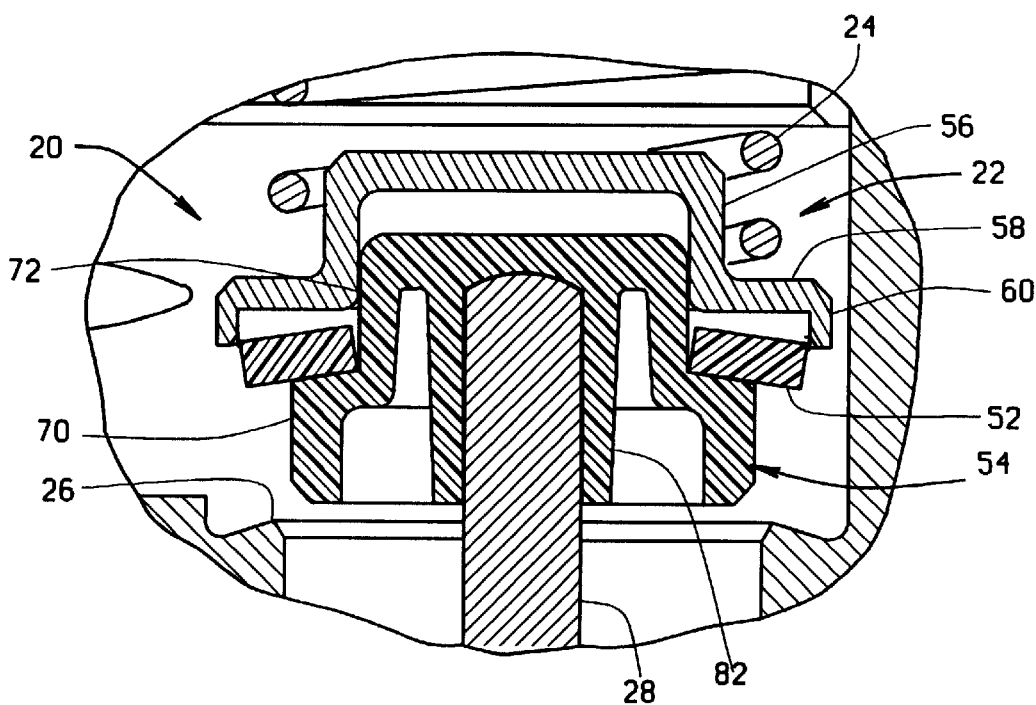
FIG. 4 a view similar to FIG. 3, but wherein the poppet valve is opened.

When the poppet valve is opened, by lifting upon the operating handle 36, the valve stem 28 raises the poppet member 22 against the bias of the spring 24. As noted above, when the valve 20 is in the close position, there is a gap between the top of the skirt post 72 and the top of the cap post 56. Hence, as the valve stem 28 is raised, it first lifts the valve skirt 54 relative to the valve cap 50. Thus, the apical section 78 of the skirt flange top surface 76 is the first portion of the skirt flange 74 to engage the seal 52. Because the seal 52 is flexible, as the valve stem 28 continues to push the valve skirt 54 upwardly relative to the valve cap 50, the sloped flanks 80 of the skirt flange 74 engage the seal 52. Thus, the seal 54 is flexed or deflected, when the valve 20 is opened to take on the configuration of the skirt flange upper surface 76, as seen in FIG. 4. Therefore, as can be appreciated, the poppet seal 52 is lifted progressively off the seat 26 as the valve is opened. That is, the seal 52 is first raised of the seat 26 in the area of the skirt apical section 78, and, as the skirt is raised further, the seal 52 is progressively lifted off the seat 26. The cap 50 is not raised until the top of the skirt post 72 engages the top of the cap post 56.

Conversely, when the valve 20 is closed, the seal 52 first engages the seat 26 at the points of the skirt flange 74 where the flange is narrowest (i.e., 90° C. from the skirt apical section 78), and progressively engages the valve seat 26 as the valve is continued to close, with the potion of the seal that is engaged with the skirt apical section 78 engaging the seat 26 last.

Thus, valve skirt 54 which is received in, and movable relative to, the valve cap 50, prevents the valve 20 from substantially instantaneously move between an open and a fully seated position. Rather, the seal 52 is progressively lifted off the seat during opening of the valve and progressively engages the seat 26 during closing of the valve 20, and there is a transition period in which the seal is partially seated during the opening and closing of the valve 20. As various changes could be made in the above constructions without departing from the scope of the invention, it is intended that all matter contained in the above description or shown in the accompanying drawings shall be interpreted as illustrative and not in a limiting sense. For example, the slope of the flank surfaces of the skirt flange 74 can be altered to affect how fast the valve opens and closes. As the slope of the flank surfaces is reduced, the valve will be moved to its open and fully seated positions more quickly. Conversely, with a steeper slope, the transition between the fully open and fully closed positions will be longer. The valve member 22 could be designed in other ways to allow for progressively moving between the fully seated and opened positions. For example, the valve member could be designed to rock about a pivot point. Alternatively, the valve seat 26 could be sloped in a manner similar to the skirt flange 74, and the seal 54 could be compressible. In this variation, which would eliminate the need for the skirt 54, the compressive seal would progressively open and close as it is moved toward the seat 26 or lifted off the seat 26. The upper surface 76 of the skirt flange 74 could define a continuous slope from one side to another, rather than having two opposed surfaces sloping downwardly from generally centrally located apex. These examples are merely illustrative.

What is claimed is:

1. A fuel dispenser having a body portion incorporating an inlet for the fuel being pumped, a spout for dispensing of the fuel, a poppet valve between said inlet and spout and being movable between an opened position in which fuel can pass through said dispenser and a closed position, in which fuel is prevented from passing though said dispenser, said valve including a valve seat, a valve member, and a valve stem; said valve stem being movable by a handle for effecting opening and closing of the poppet valve; said poppet valve being biased by a spring member to its closed position;

said valve member including a flexible seal which, when said valve is closed, engages said valve seat from underneath, and, when said valve is opened, is lifted off said valve seat;

said valve including a downwardly sloped surface engaged by said flexible valve member seal upon opening and closing of said valve whereby said valve is progressively opened during opening of said valve and progressively closed during closing of said valve such that said valve does not substantially instantaneously move between a fully seated position and a fully unseated position.

2. The fuel dispenser of claim 1 wherein said valve member includes a cap and a skirt, said skirt being movable relative to said cap; said cap defining a flange having a lower surface and an opening in said flange; said seal being adjacent said cap flange lower surface and having a seal opening generally aligned with said cap flange opening; said skirt having an upper surface adjacent a lower surface of said flexible seal, said skirt upper surface defining said valve sloped surface; said seal having a generally level surface.

3. The fuel dispenser of claim 2 wherein said sloped surface includes an apical section and opposing downwardly sloped sides extending from opposite sides of said apical section.

* * * * *